United States Patent
Fukuda et al.

(10) Patent No.: US 10,726,326 B2
(45) Date of Patent: Jul. 28, 2020

(54) LEARNING OF NEURAL NETWORK

(71) Applicant: INTERNATIONAL BUSINESS MACHINES CORPORATION, Armonk, NY (US)

(72) Inventors: Takashi Fukuda, Kanagawa-ken (JP); Osamu Ichikawa, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 1006 days.

(21) Appl. No.: 15/052,431

(22) Filed: Feb. 24, 2016

(65) Prior Publication Data

US 2017/0243113 A1    Aug. 24, 2017

(51) Int. Cl.
G06N 3/04    (2006.01)

(52) U.S. Cl.
CPC ......... *G06N 3/0472* (2013.01); *G06N 3/0454* (2013.01)

(58) Field of Classification Search
None
See application file for complete search history.

(56) References Cited

U.S. PATENT DOCUMENTS

| 2015/0032449 A1 | 1/2015 | Sainath et al. |
| 2015/0161522 A1 | 6/2015 | Saon et al. |
| 2015/0161993 A1 | 6/2015 | Sainath et al. |
| 2015/0161995 A1 | 6/2015 | Sainath et al. |

FOREIGN PATENT DOCUMENTS

CN    105243398 A  *  1/2016  ............... G06N 3/08

OTHER PUBLICATIONS

Eleyan, Alaa, and Hasan Demirel. "PCA and LDA based face recognition using feedforward neural network classifier." In International Workshop on Multimedia Content Representation, Classification and Security, pp. 199-206. Springer, Berlin, Heidelberg, 2006. (Year: 2006).*

Simonyan, Karen, and Andrew Zisserman. "Very deep convolutional networks for large-scale image recognition." arXiv preprint arXiv:1409.1556 (2014). (Year: 2014).*

Sainath, T.N., Mohamed, A.R., Kingsbury, B. and Ramabhadran, B., May 2013. Deep convolutional neural networks for LVCSR. In Acoustics, speech and signal processing (ICASSP), 2013 IEEE international conference on(pp. 8614-8618). IEEE. (Year: 2013).*

(Continued)

*Primary Examiner* — Alexey Shmatov
*Assistant Examiner* — Casey R. Garner
(74) *Attorney, Agent, or Firm* — Tutunjian & Bitetto, P.C.; Vazken Alexanian

(57) ABSTRACT

A method for learning a neural network having a plurality of filters for extracting local features performed by a computing device is disclosed. The computing device calculates a plurality of projection parameter sets by analyzing one or more training data. The plurality of the projection parameter sets define a projection of each training data into a new space and each projection parameter set has a same size as the filters in the neural network. At least part of the plurality of the projection parameter sets is set as initial parameters of at least part of the plurality of the filters in the neural network for training.

20 Claims, 10 Drawing Sheets

(56) References Cited

OTHER PUBLICATIONS

Acciani, G., E. Chiarantoni, M. Minenna, and F. Vacca. "Multivariate data projection techniques based on a network of enhanced neural elements." In Neural Networks, 1996., IEEE International Conference on, vol. 1, pp. 211-216. IEEE, 1996. (Year: 1996).*

Dorfer, Matthias, Rainer Kelz, and Gerhard Widmer. "Deep linear discriminant analysis." arXiv preprint arXiv:1511.04707(2015). (Year: 2015).*

Mohamed, Abdel-rahman, Tara N. Sainath, George E. Dahl, Bhuvana Ramabhadran, Geoffrey E. Hinton, and Michael A. Picheny. "Deep Belief Networks using discriminative features for phone recognition." In ICASSP, pp. 5060-5063. 2011. (Year: 2011).*

Sainath, Tara N., et al. "Improvements to deep convolutional neural networks for LVCSR." In 2013 IEEE Workshop on Automatic Speech Recognition and Understanding, pp. 315-320. IEEE, 2013. (Year: 2013).*

Lawrence, Steve, C. Lee Giles, Ah Chung Tsoi, and Andrew D. Back. "Face recognition: A convolutional neural-network approach." IEEE transactions on neural networks 8, No. 1 (1997): 98-113. (Year: 1997).*

Abdel-Hamid, Ossama, Abdel-rahman Mohamed, Hui Jiang, Li Deng, Gerald Penn, and Dong Yu. "Convolutional neural networks for speech recognition." IEEE/ACM Transactions on audio, speech, and language processing 22, No. 10 (2014): 1533-1545. (Year: 2014).*

Gales, Mark JF. "Semi-tied covariance matrices for hidden Markov models." IEEE transactions on speech and audio processing 7, No. 3 (1999): 272-281. (Year: 1999).*

Kalchbrenner, Nal, Edward Grefenstette, and Phil Blunsom. "A convolutional neural network for modelling sentences." arXiv preprint arXiv:1404.2188 (2014). (Year: 2014).*

Kenny, P. et al., "Eigenvoice Modeling With Sparse Training Data" IEEE Transactions on Speech and Audio Processing, vol. 13, No. 3, May 2005. (pp. 345-354).

Palaz, D. et al., "Learning Linearly Separable Features for Speech Recognition Using Convolutional Neural Networks" ICLR, Apr. 2015. (pp. 1-9).

* cited by examiner

LEARNING OF NEURAL NETWORK

BACKGROUND

The present invention, generally, relates to machine learning and, more particularly, to learning of a neural network.

Convolutional Neural Networks (CNNs), which are Artificial Neural Networks (ANNs) with many layers including at least a convolutional layer, have been widely used for various recognition processing systems such as Automatic Speech Recognition (ASR) systems, image recognition systems, etc. It has been shown that the CNNs can achieve superior accuracy as an acoustic model for the ASR. Since local windows spanning time and frequency axes are shared in the CNNs, the CNNs can capture translation invariance with far fewer parameters than normal Deep Neural Networks (DNNs) without any convolutional layer.

Typically, a neural network such as a convolutional layer followed by a DNN are first subjected to pre-training and then fine-tuning with appropriate criterion such as cross entropy criterion. Generally, weights in the neural network and, more particularly, weights in the convolutional layers, are initialized with random values before pre-training.

SUMMARY

According to an embodiment of the present invention, there is provided a computer implemented method performed by a computing device for learning a neural network that has a plurality of filters for extracting local features. The method includes calculating a plurality of projection parameter sets by analyzing one or more training data, in which the plurality of the projection parameter sets defines a projection of each training data into a new space and each projection parameter set has a same size as the filters in the neural network. The method further includes setting at least a part of the plurality of the projection parameter sets as initial parameters of at least a part of the plurality of the filters in the neural network for training.

According to another embodiment of the present invention, there is provided a computer system for learning a neural network that has a plurality of filters for extracting local features, by executing program instructions. The computer system includes a memory tangibly storing the program instructions and a processor in communications with the memory. The computer system is configured to calculate a plurality of projection parameter sets by analyzing one or more training data, in which the plurality of the projection parameter sets defines a projection of each training data into a new space and each projection parameter set has a same size as the filters in the neural network. The computer system is further configured to set at least part of the plurality of the projection parameter sets as initial parameters of at least part of the plurality of the filters in the neural network for training.

Computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The forgoing and other features and advantages of the invention are apparent from the following detailed description taken in conjunction with the accompanying drawings in which.

DETAILED DESCRIPTION

Now, the present invention will be described using particular embodiments, and the embodiments described hereafter are understood to be only referred as examples and are not intended to limit the scope of the present invention.

One or more embodiments according to the present invention are directed to computer implemented methods, computer systems and computer program products for learning a neural network that has a plurality of filters for extracting local features from an input.

Figure 1:
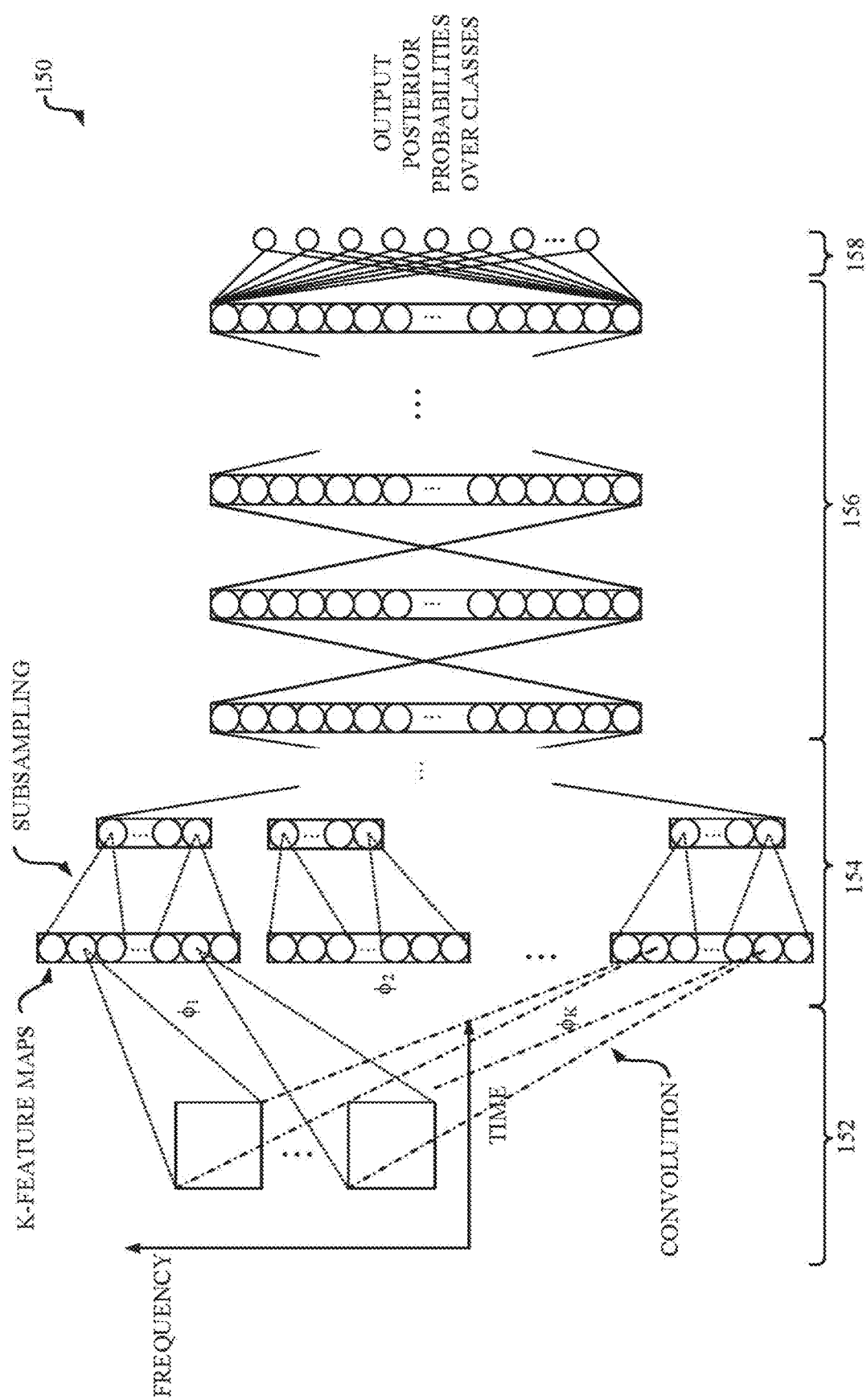
FIG. 1 depicts an exemplary architecture of a neural network used for an acoustic model, which is a target of a novel learning function according to one or more embodiments of the present invention.

A Convolutional Neural Network (CNN) is one of the most promising models used in a variety of recognition processing such as speech recognitions, etc. FIG. 1 shows an exemplary architecture of a neural network including one or more convolutional layers, which can be used for an acoustic model for speech recognition processing.

The neural network 150 depicted in FIG. 1 includes an input layer 152, one or more convolutional layers 154, one or more fully-connected layers 156 and an output layer 158. The neural network 150 shown in FIG. 1 has a typical configuration of the aforementioned CNN.

A plurality of consecutive feature frames may be used as input for the neural network 150. Each feature frame includes a plurality of features extracted from original speech signal by appropriate acoustic feature extraction. In a particular embodiment, the input for the neural network 150 can be represented as two-dimensional space in time (e.g. frames) and frequency (e.g. frequency bands) axes as shown in FIG. 1.

The one or more convolutional layers 154 may include one or more sets of a convolutional layer followed by a subsampling layer. A hidden unit in the convolutional layer takes inputs from a rectangular local window spanning time and frequency axes (e.g. N frames×M frequency bands) in the input layer 152, and multiplies those local inputs by using a localized filter (weights $\phi_i$) that can extracts local features from the input. The weights of the localized filter $\phi_i$ may be shared fully or limitedly across over input space. The convolutional layer accommodates totally K feature maps generated with different localized filters $\phi_i(i=1, \ldots, K)$, where K denotes the number of localized filters. In one or more embodiments, convolution along frequency axis and/or time axis may be applied.

The subsampling layer takes inputs from a local region of the previous convolutional layer and down-samples the inputs with a subsampling operation. The sub region of the subsampling may be or may not be overlapped. The examples of subsampling operations may include, but not limited to, max-pooling, average pooling and stochastic pooling, each of which outputs maximum value, average value or picked value by stochastic procedure within each sub region, respectively.

The one or more fully-connected layers 156 take the output of all units from the previous layer to perform class discrimination. The output layer 158 outputs posterior probability over targets corresponding to the central frame while each input of the neural network 150 is constituted from consecutive feature frames centering at a time.

Note that states of Hidden Markov Models (HMMs), which may be mono-phone HMMs or multi-phone HMMs, are used as the targets. The mono-phone HMMs are context-independent models. On the other hand, the multi-phone HMMs are context-dependent models. One of the most popular models is a tri-phone model where each distinct phone model for every different left and right phone contexts is used. There is also a quin-phone model where each distinct phone model for every different two left and two right phone contexts is used.

The number of the sets in the one or more convolutional layers 154 and the number of the hidden layers in the one or more fully-connected layers 156 may be set with each appropriate number. The one or more fully-connected layers 156 may or may not include a bottleneck layer before the output layer 158. The size of the localized filter may be set with appropriate size.

The input is fed into the input layer 152 in the neural network 150 and then the neural network 150 outputs result from the output layer 158. In automatic speech recognition systems (ASRs), the neural network 150 may output observation probability over HMM states for input acoustic features.

Parameters of the neural network 150, which may include weights between each units and biases of each unit, are optimized by training algorithm so as to classify the input correctly. Typically, the neural network 150 that includes the convolutional layers 154 followed by the fully connected layers 156 are first subjected to pre-training and then fine-tuning with appropriate criterion such as cross entropy criterion. Generally, the weights in the convolutional layers 154 are initialized with random values before pre-training. However, there is no physical meaning in initializing weights of the convolutional layers with random values. Since the initial parameters of the neural network 150 may affect a subsequent training, there is room for improvement on parameter initialization before the subsequent training.

So there are needed a method, associated computer system and computer program product capable of initializing the neural network 150 that has the convolutional layers 154 with appropriate initial parameters before the subsequent training, thereby improving discriminative capability of the neural network 10.

Therefore, in one or more embodiments according to the present invention, a novel learning process is provided, in which a neural network is initialized in a novel manner before subsequent training. The neural network 150 shown in FIG. 1 can be a target of the learning process according to one or more embodiments of the present invention.

Now, referring to the series of FIGS. 1-7, there are shown computer systems and methods for learning a neural network that has a plurality of filters according to one or more embodiments of the present invention.

First, referring to the series of FIGS. 1-5, it will be described a computer system and method for learning a neural network according to a first embodiment of the present invention. Then, referring to the series of FIGS. 1 and 6-7, it will be described a computer system and method for learning a neural network according to a second embodiment of the present invention.

First Embodiment

Figure 2:
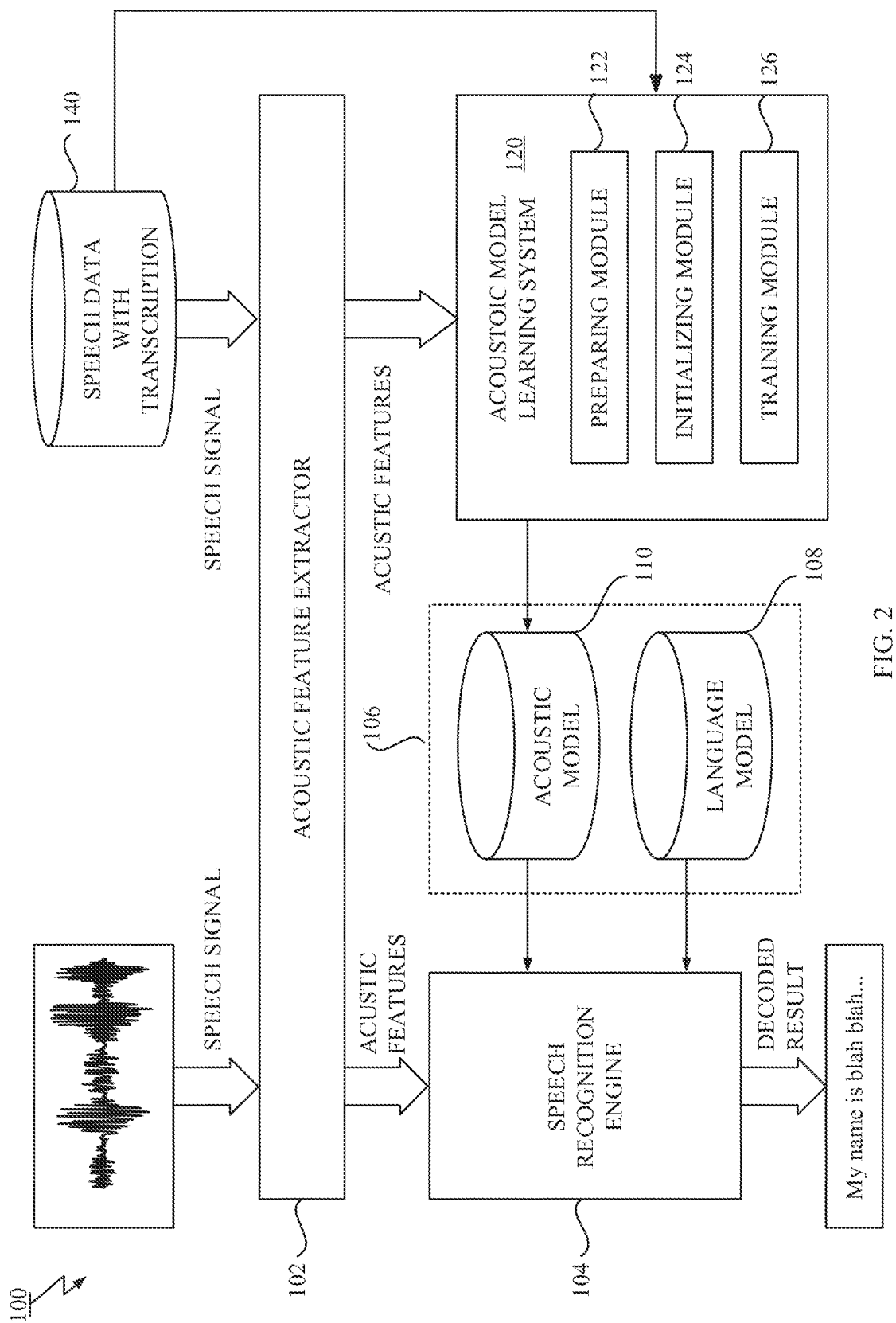
FIG. 2 illustrates a block diagram of a speech recognition system that includes an acoustic model learning system with the novel learning function according to a first embodiment of the present invention.

FIG. 2 illustrates a block diagram of a speech recognition system 100 that includes an acoustic model learning system according to the first embodiment of the present invention. As shown in FIG. 2, the speech recognition system 100 may include an acoustic feature extractor 102 that receives speech signals and extracts acoustic features from the received speech signals; a speech recognition engine 104 that receives the extracted acoustic features and outputs a decoded result based on speech recognition models 106; and an acoustic model learning system 120.

The acoustic feature extractor 102 receives the speech signals digitalized by sampling analog audio input, which may be input from a microphone for instance, at a predetermined sampling frequency and a predetermined bit depth. The acoustic feature extractor 102 extracts the acoustic features from the received speech signal by any known acoustic feature analysis and then outputs a sequence of the extracted acoustic features. The speech signal may be provided as an audio file, an audio stream from recording device such as microphone, or an audio stream via network socket.

In one or more embodiments, the acoustic features include, but not limited to, MFCC (Mel Frequency Cepstral Coefficient), LPC (Linear Predictive Coding) Coefficient, PLP (Perceptual Liner Prediction) Cepstral Coefficient, log mel spectrum, raw input features, or any combinations thereof. The acoustic features may further include dynamical features such as delta features and delta-delta features of the aforementioned acoustic features.

The speech recognition engine 104 receives the sequence of the extracted acoustic features and predicts most plausible speech contents based on the speech recognition models 106.

The speech recognition models 106 may include a language model 108 and an acoustic model 110. The language model 108 is a model representing probability distribution of word sequence and may be, but not limited to, n-gram model or neural network based model. The acoustic model 110 is a model representing relationship between input acoustic features and linguistic units constituting a speech. Among the speech recognition models 106, the acoustic model 110 may be a target of the learning function according the first embodiment of the present invention. The acoustic model 110 will be described in more detail later.

Thus, the speech recognition engine 104 finds a word sequence with maximum likelihood by integrating the language model 108 and the acoustic model 110 based on the sequence of the acoustic features provided from the acoustic feature extractor 102, and outputs the word sequence found as the decoded result.

The acoustic model learning system 120 performs the learning process according to the first embodiment of the present invention so as to build the acoustic model 110. In the first embodiment, the acoustic model 110 includes a neural network that has a plurality of filters extracting local features from input. The neural network 150 shown in FIG. 1 is one example of such neural network to which the learning process can be applicable.

The acoustic model learning system 120 performs the learning process by using given training set to build the acoustic model 110. In the describing embodiment, speech data 140 with transcription is provided as the training set. The speech data 140 include a plurality of utterances and corresponding transcriptions. The speech data 140 may be stored in a memory of a computing device.

The neural network 150 constituting the acoustic model 110 is shown illustratively in FIG. 1. However, the neural network for the acoustic model 110 can be based on any one of known neural network architectures as long as the neural network has a plurality of filter for extracting local feature. Also, in the describing embodiment, the acoustic model 110 may be a hybrid NN (Neural Network)-HMM model, where the neural network is used to directly compute observation probability distribution for each HMM state instead of standard Gaussian Mixture Models (GMM) in the GMM/HMM system. However, the acoustic model 110 is not limited to the aforementioned NN-HMM model. In other embodiment, the acoustic model 110 may be other type of NN-HMM model that is based on tandem or "bottleneck feature" approach, where the neural network is used to extract features as input for standard GMM/HMM system in place of or in addition to standard acoustic features.

By referring to FIG. 2, a more detailed module configuration of the acoustic model learning system 120 is described. As shown in FIG. 2, the acoustic model learning system 120 includes a preparing module 122; an initializing module 124; and a training module 126.

The preparing module 122 is configured to prepare one or more training data for parameter initialization from the speech data 140 with transcription. More specifically, the preparing module 122 is configured to prepare a plurality of training data by sliding a local window along with at least one direction over one or more speech data 140. In a preferable embodiment, the sliding is performed along with a direction of the frequency axis at the same current frame. Note that the local window has a same size as a target localized filters $\phi_i$ in the neural network 10. For instance, if the target localized filters in the neural network 150 have a size of 9 frames×9 frequency bands, the local window should have an identical size of 9 frames×9 frequency bands.

In a particular embodiment, the target localized filters may be a plurality of filters in a first convolutional layer just above the input layer 152 in the one or more convolutional layers 154. However, there is no limitation on which convolutional layers can be targeted. In other embodiment, the target localized filters may be a plurality of filters in each convolutional layer if there are two or more convolutional layers in the neural network 150.

Each training data includes acoustic features having the size of the local window and an associated class label. Any one of phones including mono-phone HMM states and multi-phone HMM states or syllable may be used as the class label. Note that the class labels for the parameter initialization may be identical to the targets of the neural network 150 or may not be identical to the targets of the neural network 150. The class label can be aligned to each center frame by conventional forced alignment technique based on standard GMM/HHM system using the corresponding transcription. The transcriptions are typically transcribed by human experts and are used to produce class labels for each utterance.

The initializing module 124 is configured to calculate a plurality of projection parameter sets by analyzing one or more training data prepared by the preparing module 122. The initializing module 124 is also configured to set at least a part of the plurality of the calculated projection parameter sets as initial parameters of at least a part of the plurality of the localized filters in the neural network 150 for subsequent training.

Target of the parameter initialization using the projection parameter sets may be weights of the plurality of the localized filters. In a particular embodiment, remaining parameters of the neural network 150 other than the weights of the at least a part of the filters can be set with initial value in a conventional manner. For instance, other weights of the filters other than the weights of the at least a part of the filters that are set by using the projection parameter sets can be set with random initial values.

In the describing embodiment, the plurality of the calculated projection parameter sets defines a projection of each training data into a new space depending on each associated class label. Each projection parameter set has a same size as the target localized filter in the neural network 150, and defines a direction of each new axis of the new space.

In a particular embodiment, calculation of the plurality of the projection parameter sets can be performed by finding the plurality of the projection parameter sets so as to maximize separability of data points each defining the acoustic features of the training data with different classes in the new space and to minimize variability of data points defining the acoustic feature of the training data with same class in the new space. More practically, the calculation may be conducted by estimating eigenvectors based on a Linear Discriminant Analysis (LDA) criterion, in which the projection parameter sets are obtained as the eigenvectors that form a projection (or LDA) matrix θ.

In a particular embodiment, selection of the plurality of the projection parameter sets as the initial parameters may be conducted based on scaling factors, in which each scaling factor corresponds to each projection parameter set and is calculated together with the projection parameter set by the analyzing. In particular embodiments with LDA criterion, the scaling factor is an eigenvalue corresponding to the eigenvector. The eigenvalue can tell about magnitude of distortion of transformation defined by the associated eigenvector.

The training module 126 is configured to train the neural network 150 with the initial parameters set by the initializing module 124. The training of the neural network 150 may be, but not limited to, done by performing pre-training and discriminative fine-tuning processes. The pre-training is a process in which the system finds representation that well captures characteristics of the input in a layer-by-layer manner. The fine-tuning is a process in which the system finds final parameters for classification based on the representations estimated by the pre-training process.

However, training process for the neural network 150 after the parameter initialization by the initializing module 124 is not limited to the aforementioned techniques, any known training technique can be applicable to the neural network 150 with initialized values.

In a particular embodiment with two or more convolutional layer, filters in a second or upper convolutional layer can be also targeted for the parameter initialization. When the filters in the second or upper convolutional layer are targeted, outputs from a subs ampling layer on top of a previous convolutional layer, which are obtained by feeding inputs to the previous convolutional layer with parameters obtained by the parameter initialization and the pre-training according to the first embodiment of the invention, can be used as inputs for the second or upper convolutional layer.

In the particular embodiment, the preparing module 122 may prepare training data by sliding a local window, which has a same size as the localized filters in the second or upper convolutional layer, over the outputs from the previous subsampling layer. The initializing module 124 may calculate a plurality of projection parameter sets for the second or upper convolutional layer by analyzing the training data prepared for the second or upper convolutional layer. Then, the initializing module 124 may set at least a part of the plurality of the calculated projection parameter sets as initial parameters of at least a part of the plurality of the localized filters in the second or upper convolutional layer for subsequent training.

In particular embodiments, each of modules 102, 104, 108, 110, 120 and 140 as well as each of submodules 122, 124 and 126 of the acoustic model learning system 120 described in FIG. 2 may be, but not limited to, implemented as a software module including program instructions and/or data structures in conjunction with hardware components such as a processor, a memory, etc.; as a hardware module including electronic circuitry; or as a combination thereof. These modules 102, 104, 108, 110, 120, 122, 124, 126 and 140 described in FIG. 2 may be implemented on a single computer device such as a personal computer and a server machine or over a plurality of devices such as a computer cluster of the computer devices in a distributed manner.

Figure 3:
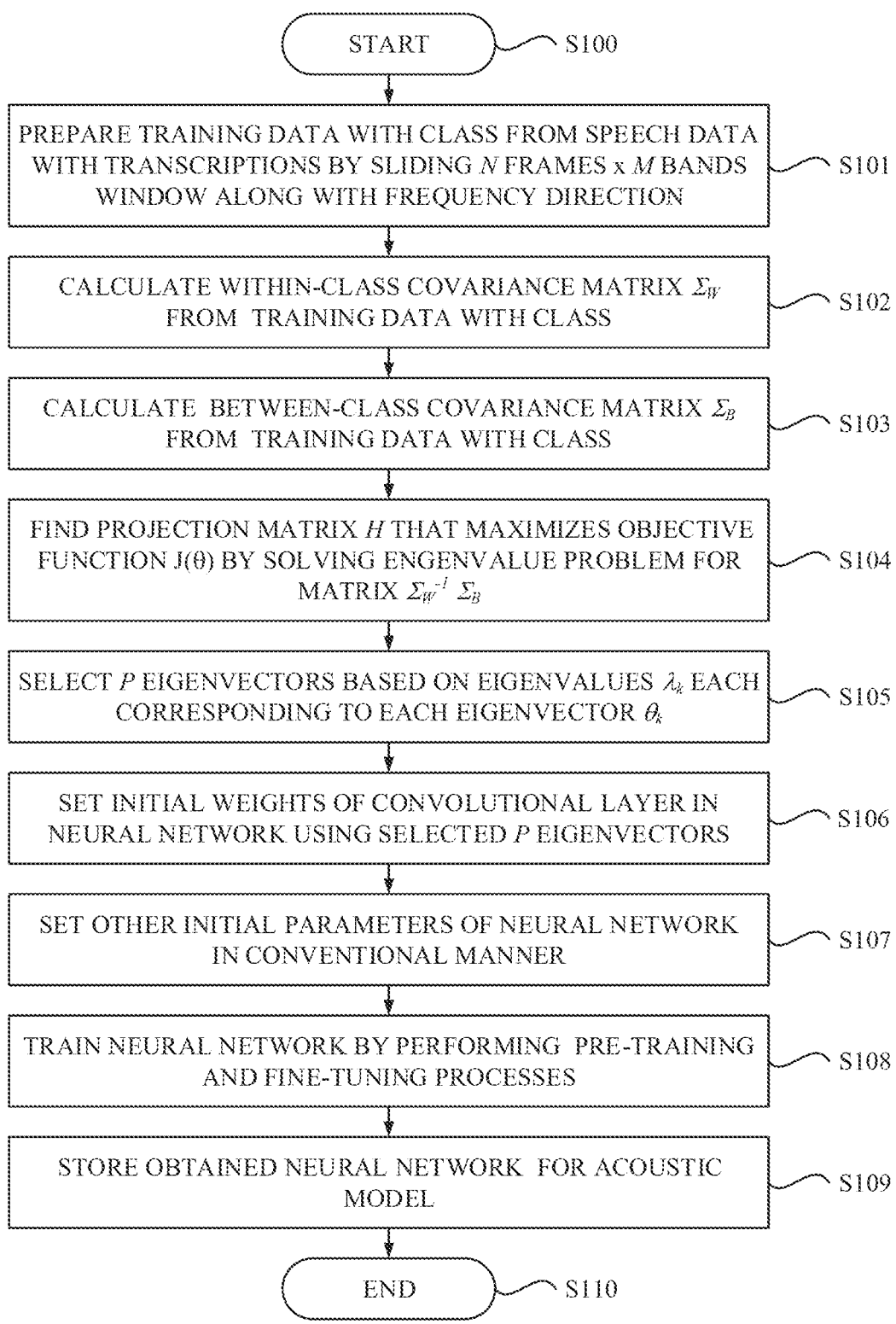
FIG. 3 is a flowchart depicting a novel learning process for learning a neural network based acoustic model according to the first embodiment of the present invention.

FIG. 3 shows a flowchart depicting the learning process for learning the neural network-based acoustic model according to the first embodiment of the present invention. Note that the learning process shown in FIG. 3 is based on the LDA criterion, in which the calculation of the projection parameter sets is done by the LDA.

As shown in FIG. 3, process begins at step S100. Note that the process shown in FIG. 3 may be performed by a processor that implements the acoustic model learning system 120 shown in FIG. 2, for the given speech data 140 stored in a memory operably coupled to the processor.

At step S101, the preparing module 122 reads the speech data 140 via the acoustic feature extractor 102, and prepares the one or more training data with the class label from the speech data 140 with associated transcriptions. First, the preparing module 122 assigns the class label into each frame by the forced alignment technique using the corresponding transcription. Then, the preparing module 122 slides the local window along with the direction of the frequency axis at certain central frame over one or more speech data.

Figure 4:
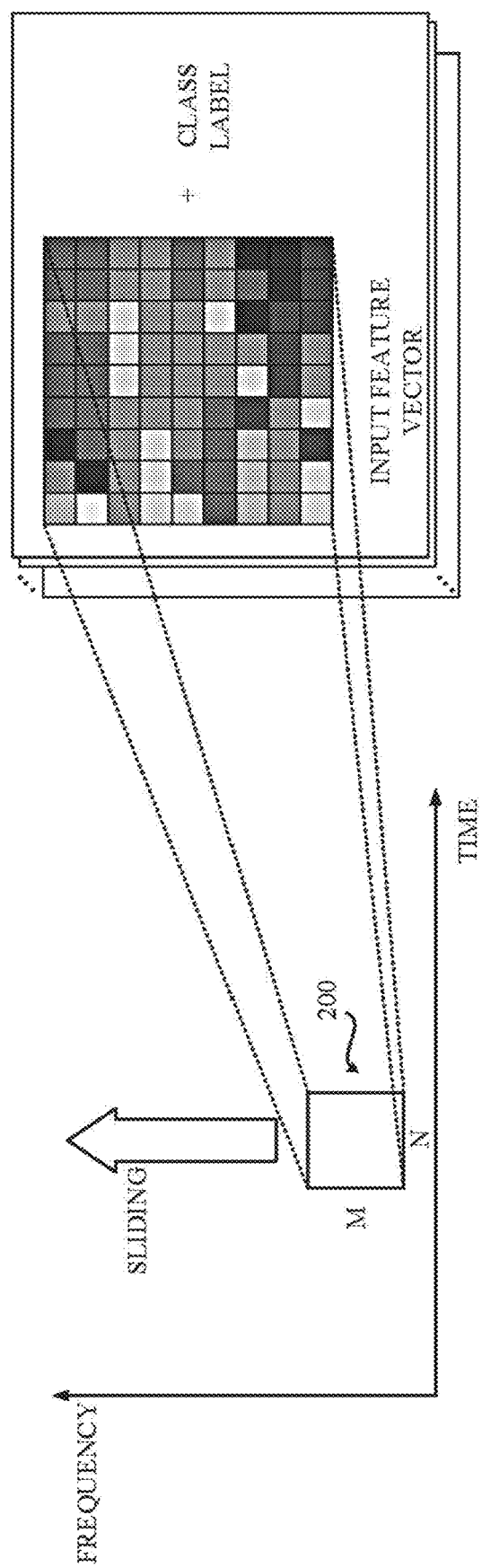
FIG. 4 shows a schematic describing a preparation of training data for Linear Discriminant Analysis (LDA) in the novel learning process according to the first embodiment of the present invention.

FIG. 4 describes a preparation of training data for the LDA in the learning process. As shown in FIG. 4, the local window 200 with a size of N frames×M frequency bands, which has a size identical to that of the target localized filters $\phi_i$ in the neural network, are slid along the direction of the frequency axis at the central frame to generate training data each having an N×M dimensional input feature vector and a class label associated with the central frame. The input feature vector of a sample j (j=1, ..., $n_i$) with a class i (i=1, ... C) is denoted by $x_{i,j}$, where $n_i$ represents the number of the samples with the class i and C denotes the number of the different classes.

Referring back to FIG. 3, at step S102, the initializing module 124 calculates a within-class covariance matrix $\Sigma_W$ from the training data with class prepared in the step S101. First, the initializing module 124 calculates class means $m_i$ for each class i (i=1, ..., C) as shown by the following equation:

$$m_i = \frac{1}{n_i} \sum_{j=1}^{n_i} x_{i,j}.$$

The within-class covariance matrix $\Sigma_W$ can be calculated by the following equation:

$$\Sigma_W = \sum_{i=1}^{C} \sum_{j=1}^{n_i} (x_{i,j} - m_i)(x_{i,j} - m_i)^T.$$

At step S103, the initializing module 124 calculates a between-class covariance matrix $\Sigma_B$ from the training data with class prepared in the step S101. First, the initializing module 124 calculates a global mean m for whole training data as shown by the following equation:

$$m = \frac{1}{n} \sum_{i=1}^{C} n_i m_i,$$

where n denotes total the number of samples in the whole training data. The between-class covariance matrix $\Sigma_B$ can be calculated by following equation:

$$\Sigma_B = \sum_{i=1}^{C} n_i (m_i - m)(m_i - m)^T.$$

At step S104, the initializing module 124 finds a projection matrix $\theta$ that maximizes an objective function $J(\theta)$ expressed as follows:

$$J(\theta) = \frac{\det(\theta^T \Sigma_B \theta)}{\det(\theta^T \Sigma_W \theta)}.$$

The projection matrix $\theta$ can be found by solving eigenvalue problem for a matrix that is a product of an inverse of the within-class covariance matrix and the between-class covariance matrix, $\Sigma_W^{-1} \Sigma_B$.

The eigenvalue problem of a matrix can be solved by using any known eigenvalue solver, which may be provided by any known available numerical libraries. In the step S104, by solving the eigenvalue problem for the matrix $\Sigma_W^{-1} \Sigma_B$, the projection matrix $\theta$ composed of eigenvectors $\theta_k$ (k=1, ..., N×M) as well as corresponding eigenvalues $\lambda_k$ (k=1, ..., N×M) are estimated based on the LDA criterion. Each projection parameter set is obtained as each eigenvectors $\theta_k$.

Figure 5A:
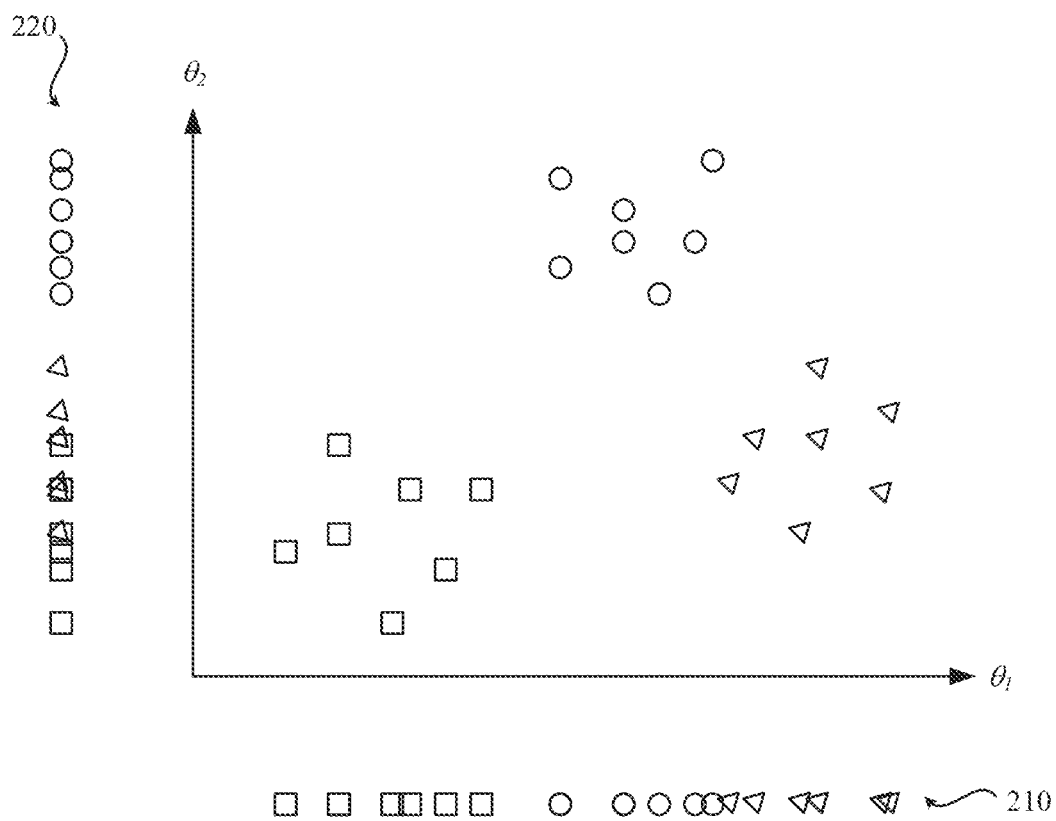
FIG. 5A schematically shows a scatter plot of training data projected on first two components of a projection matrix obtained based on the LDA in the novel learning process according to the first embodiment of the present invention.

FIG. 5A schematically shows a scatter plot of training data projected on first two eigenvectors of the projection matrix $\theta=\{\theta_1, \theta_2, \ldots, \theta_n, \ldots, \theta_{N \times M}\}$ obtained based on the LDA. The plurality of the projection parameter set, that is the projection matrix $\theta$, defines a projection of the acoustic features of each training data into a new space depending on class.

As shown in FIG. 5A, points of the acoustic features are projected into the new space so that the training data with different classes (points of different classes are represented by different shapes including circle, square and triangle in FIG. 5A) are projected separatively and the training data with same class (points of same class are represented by the same shape) are projected aggregatively. Each projection parameter set, that is each eigenvector, defines a direction of each new axis that is optimal for distinguishing between the different classes as depicted in FIG. 5A, in which projections 210, 220 on the lines of the first two eigenvectors are illustrated.

Referring back to FIG. 3, at step S105, the initializing module 124 selects P eigenvectors from among the eigenvectors $\theta_k$ (k=1, ..., N×M) obtained in step S104 based on their eigenvalues $\lambda_k$ (k=1, ..., N×M). In a particular embodiment, the initializing module 124 first sorts the eigenvectors by ascending order, and selects the predetermined number P of the eigenvectors with largest eigenvalues. In particular embodiments, the predetermined number P may be any value not more than the number of the filter K.

However, the way for selecting the eigenvectors is not limited to the aforementioned way using the predetermined number P. In other particular embodiment, the initializing module 124 can repeatedly select the eigenvector with largest eigenvalue among remaining eigenvectors until an accumulated value of magnitude of the eigenvalues corresponding to the selected eigenvectors exceeds a predetermined threshold. In this case, the number P may be varied depending on the calculated eigenvalues.

At step S106, the initializing module 124 sets the initial parameters of at least part of the convolutional layer in the neural network 150 by using the selected P eigenvectors. At step S 107, the initializing module 124 sets other initial parameters of the neural network 150 in a conventional manner.

Figure 5B:
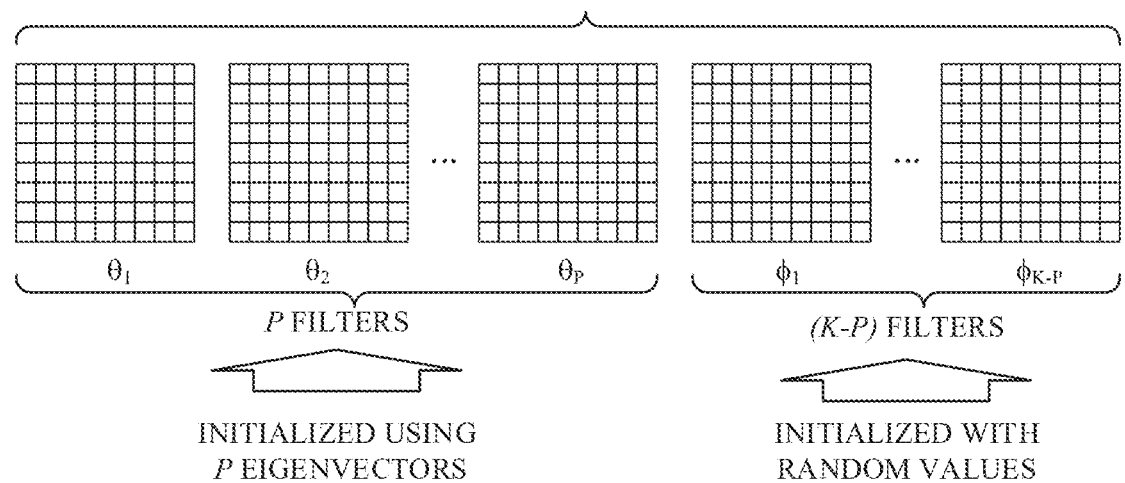
FIG. 5B shows a schematic describing an initialization of weights of a convolutional layer in the novel learning process according to the first embodiment of the present invention.

FIG. 5B describes an initialization of weights for the convolutional layer. As shown in FIG. 5B, among the K localized filters in the convolutional layer of the neural network 150, initial weights for P localized filters are replaced by the P eigenvectors $(\theta_1, \theta_2, \ldots, \theta_P)$. Weights for remaining (K-P) localized filters $(\phi_1, \ldots, \phi_{K-P})$ other than the weights of the localized filters that are replaced by using the eigenvectors, can be set with random initial values.

Referring back to FIG. 3, at step S108, the training module 126 trains the neural network 150 that is initialized in steps S106 and S107, by performing pre-training and fine-tuning process. At step S109, the acoustic model learning system 120 stores the currently obtained parameters of the neural network 150 for the acoustic model 110 and the process ends at step S110.

In the describing embodiment, the whole of the neural network 150 is included in the acoustic model 110. The obtained acoustic model 110 based on the hybrid NN/HMM system outputs calculated acoustic score based on the estimated posterior probabilities over the HMM states.

The neural network 150 build by the learning process described in FIGS. 2-5 with novel parameter initialization can acquires discriminative capability provided by the plurality of the projection parameter sets that is obtained by analyzing the given speech data. In a particular embodiment with the LDA criterion, the neural network 150 can acquire discriminative capability provided by linear discriminants that are obtained by the LDA based on the given speech data.

Although the parameters of the neural network 150 will be updated by subsequent training process, however, since the parameters of the neural network 150 are initialized to a better starting point, hence, the neural network 150 can converge to better local optima by the subsequent training process in comparison with a case where all filter weights in the convolutional layer are initialized with random values. After the learning process, the neural network 150 can output probabilities over states of the HMM with better accuracy.

According to the first embodiment of the present invention, the neural network can be initialized with appropriate initial parameters before subsequent training, thereby improving discriminative capability of the neural network. Therefore, the neural network built by the novel learning process can have improved accuracy. Furthermore, it is not necessary to modify conclusive topology, which is defined by the number of the convolutional layer, the number of the fully connected layers, and the number of the units in input, convolutional intermediate and output layers. Hence, no extra computational cost during the recognition processing is expected.

The languages, to which the invention may be applicable, is not limited and may include, by no means limited to, Arabic, Chinese, English, French, German, Japanese, Korean, Portuguese, Russian, Spanish for instance.

Second Embodiment

In the aforementioned first embodiment, whole frequency components of the speech data 140 are used for the parameter initialization without distinction. In a speech, patterns in different frequency regions may appear differently. Thus, training speech inputs can be divided into a plurality of frequency components and the training speech inputs for each component can be used distinctively for the parameter initialization.

Now, referring to the series of FIGS. 1 and 6-7, it will be described a computer system and method for learning a neural network according to a second embodiment of the present invention, in which a neural network that has a plurality of filters extracting local features is initialized in a novel manner before subsequent training using each frequency component of the training speech inputs distinctively.

A block diagram of a speech recognition system according to the second embodiment of the present invention is almost same as that of the first embodiment shown in FIG. 2. An acoustic model learning system 120 performs a novel learning process according to the second embodiment of the present invention to build the acoustic model 110 using given speech data 140. In the second embodiment, a neural network constituting the acoustic model 110, which is shown exemplary in FIG. 1, is also a target of the novel learning process.

Since the configuration of the second embodiment has similarity to the first embodiment, hereinafter, mainly features different from the first embodiment will be focused.

In the second embodiment, the preparing module 122 is configured to prepare each group of training data by sliding a local window along with a direction of a frequency axis within each limited range. Note that the local window has a same size as a target localized filters in the neural network 150. The limited ranges may be a plurality of limited frequency ranges such as a high frequency component and a low frequency component of the acoustic feature of the speech data 140.

In the second embodiment, the initializing module 124 is configured to calculate a plurality of projection parameter sets for each limited range by analyzing each group of the training data prepared by the preparing module 122. The obtained projection parameter sets for each limited range may be merged as candidates for selecting as initial weights of a target localized filter. The initializing module 124 is further configured to set at least a part of the merged projection parameter sets calculated for the plurality of the limited ranges as initial parameters of at least a part of the plurality of the localized filters in the neural network 150.

In a particular embodiment, calculation of the plurality of the projection parameter sets for each limited range can be found by estimating eigenvectors from each group of the training data based on the LDA criterion.

Figure 6:
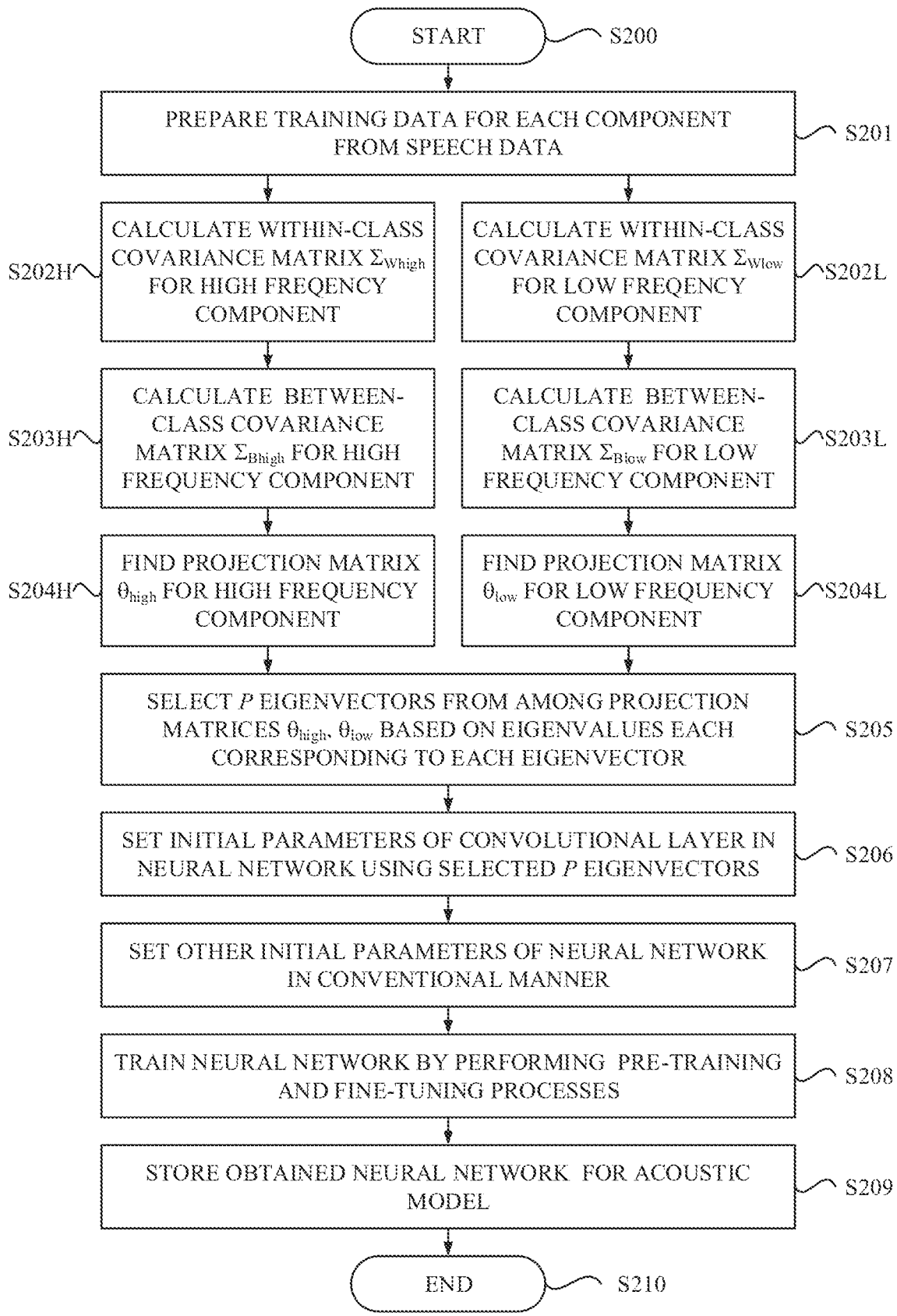
FIG. 6 is a flowchart depicting a novel learning process for learning a neural network based acoustic model according to a second embodiment of the present invention.

FIG. 6 shows a flowchart depicting the novel learning process for learning the neural network-based acoustic model according to the second embodiment of the present invention. Note that the novel learning process shown in FIG. 6 is also based on the LDA criterion, in which the calculation of the projection parameter sets is done by the LDA for each limited range.

As shown in FIG. 6, process begins at step S200. Note that the process shown in FIG. 6 may be performed by a processor that implements the acoustic model learning system 120 for the given training speech data 140 stored in a memory operably coupled to the processor.

At step S201, the preparing module 122 reads the speech data 140 and prepares the each group of the training data with class label for each component from the speech data 140 with associated transcriptions. In the describing embodiment, high and low frequency components of the speech data 130 are divided so as to generate two groups of the training data.

Figure 7:
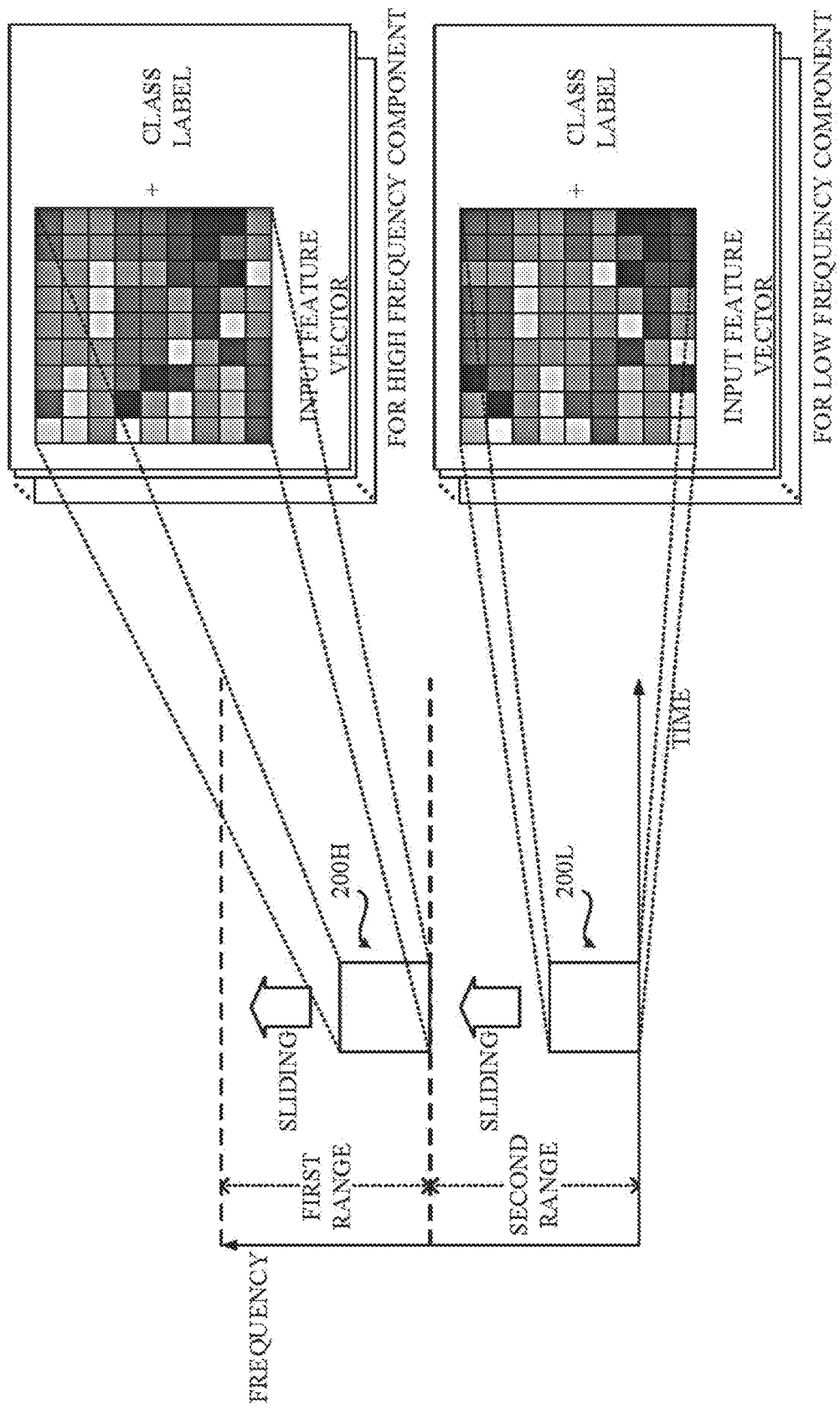
FIG. 7 shows a schematic describing a preparation of training data for the LDA in the novel learning process according to the second embodiment of the present invention.

FIG. 7 describes a preparation of training data for the LDA in the novel learning process according to the second embodiment of the present invention. As shown in FIG. 7, the local windows 200H and 200L are moved along frequency direction within corresponding limited frequency ranges (first or second range) to generate each group of the training data, each of which has an N×M dimensional input feature vector and a class label associated with the central frame.

Referring back to FIG. 6, processing of steps S202-S204 is conducted for each group of the training data prepared in step 201. In the describing embodiment, steps S202H-S204H for the high frequency components and steps S202L-S204L for the low frequency component are performed in parallel or in sequence.

At step S202H and S202L, the initializing module 124 calculates within-class covariance matrices $\Sigma_{Whigh}$ and $\Sigma_{Wlow}$ from the groups of the training data with class, respectively. At step S203H and S203L, the initializing module 124 calculates between-class covariance matrices $\Sigma_{Bhigh}$ and $\Sigma_{Blow}$ from the groups of the training data with class, respectively.

At step S204H and S204L, the initializing module 124 finds projection matrices $\theta_{high}$ and $\theta_{low}$, each of which maximizes each objective function $J(\theta_{high})$ and $J(\theta_{low})$, respectively, by solving eigenvalue problems for matrices $\Sigma_{Whigh}^{-1}\Sigma_{Bhigh}$ and $\Sigma_{Wlow}^{-1}\Sigma_{Blow}$. In the step S204H and S204L, by solving the eigenvalue problem, the projection matrices $\theta_{high}$ and $\theta_{low}$ are estimated based on the LDA criterion, respectively.

At step S205, the initializing module 124 selects P eigenvectors from among the eigenvectors $\theta_k$ (k=1, . . . , 2NM) obtained in steps S204H and S204L based on their eigenvalues $\lambda_k$(k=1, . . . , 2NM). Note that the eigenvectors $\theta_k$ (k=1, . . . , NM) and the eigenvectors $\theta_k$ (k=NM+1, . . . , 2NM) constitutes the projection matrix $\theta_{high}$ and the projection matrix $\theta_{low}$, respectively.

In a particular embodiment, the initializing module 124 first sorts all eigenvectors $\theta_k$ (k=1, . . . , 2NM) by ascending order, and selects the predetermined number P of the eigenvectors with largest eigenvalues. In other particular embodiment, the initializing module 124 first sorts each group of the eigenvectors for the high and the low frequency components by ascending order, and selects the predetermined number of the eigenvectors with largest eigenvalues for each component. For instance, the initializing module 124 may select each predetermined number P/2 of the eigenvectors for each component. In others, the initializing module 124 may select the predetermined number Q of the eigenvectors for the high frequency component and the predetermined number R of the eigenvectors for the low frequency component (P=Q+R). Alternatively, instead of using the predetermined number P, the initializing module 124 can repeatedly select the eigenvector with largest eigenvalue among remaining eigenvectors until an accumulated value of magnitude of selected eigenvectors exceeds a predetermined threshold for all eigenvectors or for each group of the eigenvectors.

At step S206, the initializing module 124 sets the initial weights of the convolutional layer in the neural network 150 by using the selected P eigenvectors. At step S207, the initializing module 124 sets other initial parameters of the neural network 150 in conventional manner. At step S208, the training module 126 trains the neural network 150 initialized in steps S106 and S107, by performing pre-training and fine-tuning processes. At step S209, the acoustic model learning system 120 stores the currently obtained parameters of the neural network 150 for the acoustic model 110 and the process ends at step S210.

The neural network 150 built by the learning process described in FIGS. 6-7 with novel parameter initialization can acquires improved discriminative capability provided by the LDA based on the training data. Since training data are grouped by the frequency components each having a limited range and the LDA is performed for each frequency component, therefore, the number of the eigenvectors with larger eigenvalue can be expected to increase. Some localized filters in the convolutional layer of the neural network are initialized so as to be suitable for patterns in the high frequency range, whereas others are initialized so as to be suitable for patterns in the low frequency range.

According to the second embodiment of the present invention, the neural network can be initialized with more appropriate initial parameters before subsequent training, thereby further improving discriminative capability of the neural network. Therefore, the neural network built by the novel learning process can have improved accuracy.

Alternative Embodiments

In the aforementioned embodiments, the eigenvectors obtained by the LDA are used as filters' weights without any post-processing. However, in an alternative embodiment, the eigenvectors obtained with the LDA criterion can be further approximately orthogonalized by any known orthogonalization techniques such as semi-tied covariance (or maximum likelihood linear transform) based technique in order to improve further recognition performance. Then, the initial parameters of the at least part of the convolutional layer in the neural network can be set using the orthogonalized eigenvectors.

In the aforementioned embodiments, the training data are prepared from the speech data 140 regardless of their attributes. However, the speech data may have various characteristics depending on recording environments, speaker' feature, speech rate, etc. Thus, in other alternative embodiments, the speech data 140 can be grouped by attributes such as noisy, clean, male, female, etc. and the projection matrix may be calculated for each attribute from each group of the training data with same attribute. The obtained projection parameter sets for each attribute can be merged as candidates for selecting as the initial weights of the target localized filters.

In the aforementioned embodiments, the LDA is used for analyzing the training data. However, analysis performed in the novel learning process may be not limited to the LDA. In alternative embodiment, Principal Component Analysis (PCA) can be used for analyzing the training data. In the embodiment with the PCA, the initializing module 124 estimates eigenvectors of a covariance matrix by the PCA based on the features of the training data. The plurality of the projection parameter sets are obtained as the eigenvectors.

Furthermore, above-mentioned parameter initialization may also be involved in learning of neural networks used for various recognitions other than the speech recognition. In another embodiment, there is provided a computer system and method for learning neural network, in which a neural network is used for other recognition processing such as image recognition processing for instance.

Experimental Studies

A program implementing the system and process shown in FIGS. 2-5 according to the first embodiment was coded and executed for given training speech samples. A neural network based acoustic mode (NN-AM) shown in FIG. 1 with convolutional and max-pooling layers, fully-connected layers and input and output layers was created as a target of the learning process.

The number of the convolutional layers was two. The number of the localized filters (or kernels) in the first convolutional layer was 128. The size of the localized filter in the first convolutional layer was 9 frames×9 frequency bands. Convolution along with frequency axis was applied in the convolutional layers. The fully connected layers in the neural network included five hidden layers of 1024 hidden units and a bottleneck layer of 512 units. The bottleneck layer was positioned just beneath the output layer. The number of the output layer of the neural network was 5000. Each unit in the output layer was corresponded to each quin-phone HMM state.

87 hours of speech data with manual transcriptions were prepared for the parameter initialization. The language of utterances included in the speech data was Japanese. Log mel spectrum with 40 bands was used as acoustic feature input. A class label was aligned to each center frame by the forced alignment technique based on standard GMM/HHM system. 5000 of quin-phone HMM states were used as the class labels for the parameter initialization. Training data were prepared by sliding a local window having 9 frames×9 frequency bands along with a direction of frequency axis over the speech data.

As for examples and comparative example, the neural network was learned by the learning process shown in FIG. 3 with various predetermined numbers P. The predetermined number P was set to be 0 (comparative example), 32 (example 1), 64 (example 2) and 81 (example 3). The localized filters in the first convolutional layer were used as targets of the novel parameter initialization. The weights for P localized filters were replaced by calculated P eigenvectors with largest eigenvalues while others were initialized with random values.

In the examples and the comparative example, after the learning of the neural network was completed, the neural network from the input layer to the output layer was stored as the acoustic model. The test speech data with transcriptions were prepared. Then, ASR accuracy of the obtained speech recognition models was evaluated for the examples and the comparative example. CER (Character Error Rate) was utilized as ASR accuracy metric.

Unless otherwise noted, any portions of the speech recognition model except for initial parameters of the acoustic model were approximately identical between the examples and the comparative examples. The final topologies of the neural network in the examples were identical to that of the comparative example. The subsequent training after the parameter initialization in the examples was also identical to that of the comparative example.

The evaluated results of the examples and the comparative examples are summarized as follows:

| Acoustic Model | CER [%] | | | |
| --- | --- | --- | --- | --- |
|  | speaker #1 | speaker #2 | speaker #3 | average |
| Comparative Example 1 (conventional parameter initialization) | 14.1 | 21.7 | 12.3 | 16.0 |
| Example 1 (initialized using top 32 eigenvectors) | 13.6 | 21.2 | 12.1 | 15.6 |
| Example 2 (initialized using top 64 eigenvectors) | 13.3 | 20.6 | 10.2 | 14.7 |
| Example 3 (initialized using all 81 eigenvectors) | 13.1 | 20.6 | 12.0 | 15.2 |

The baseline NN-AM showed 16.0% CER for average. By comparison with the result of the comparative example, all examples were shown to be reduced CER for plurality of test datasets of different speakers, showing improvement of recognition accuracy. Among the examples, the second example (Example 2) using top 64 eigenvectors, that was in a range from 4/10 to 7/10 of the number of the target localized filters, showed best improvement.

It was confirmed that the proposed learning process with the novel parameter initialization improved accuracy in several speakers' data sets, indicating that the proposed learning process is not dependent on specific data sets.

Cloud Environment Implementation

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
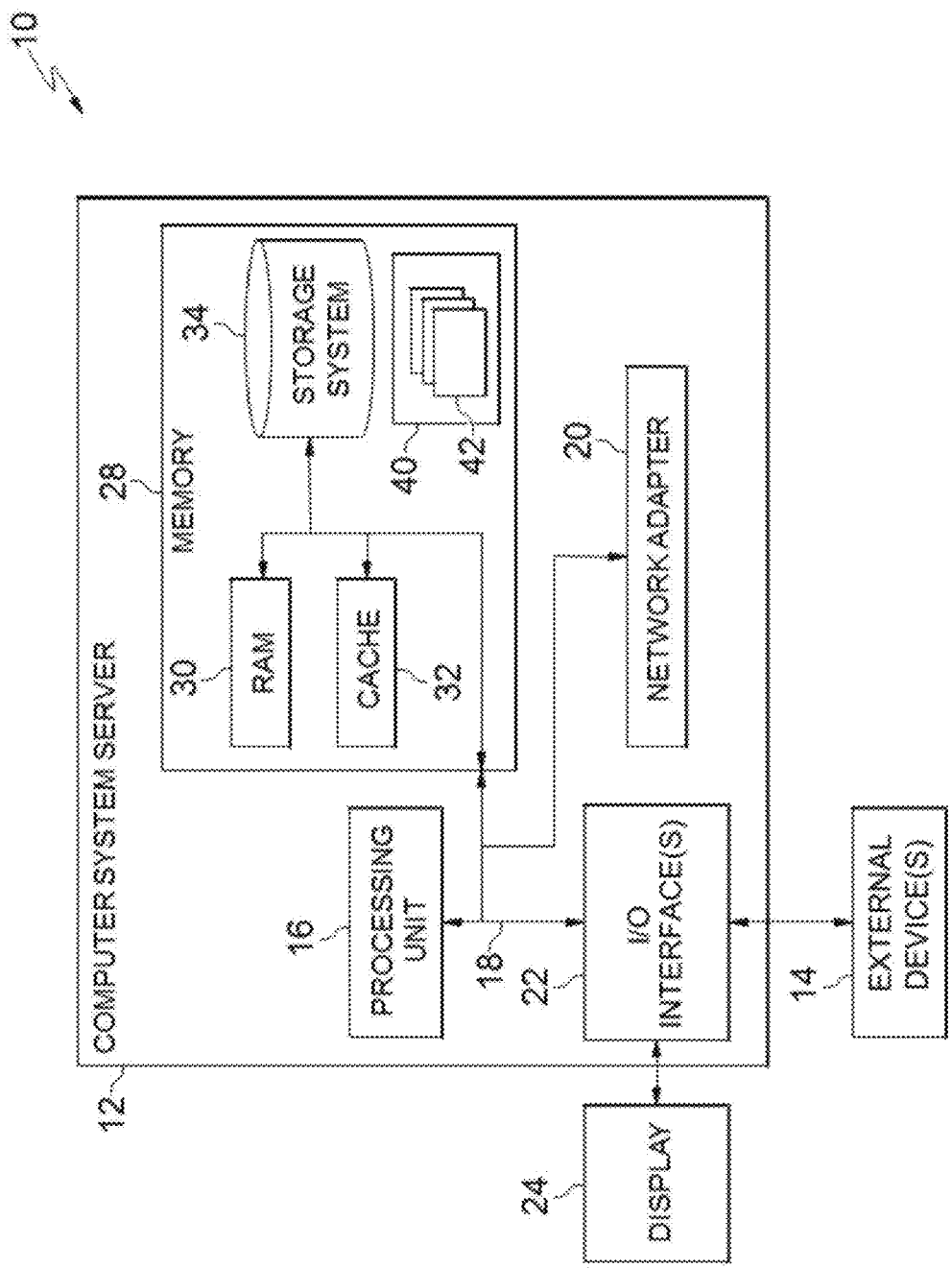
FIG. 8 depicts a cloud computing node according to an embodiment of the present invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
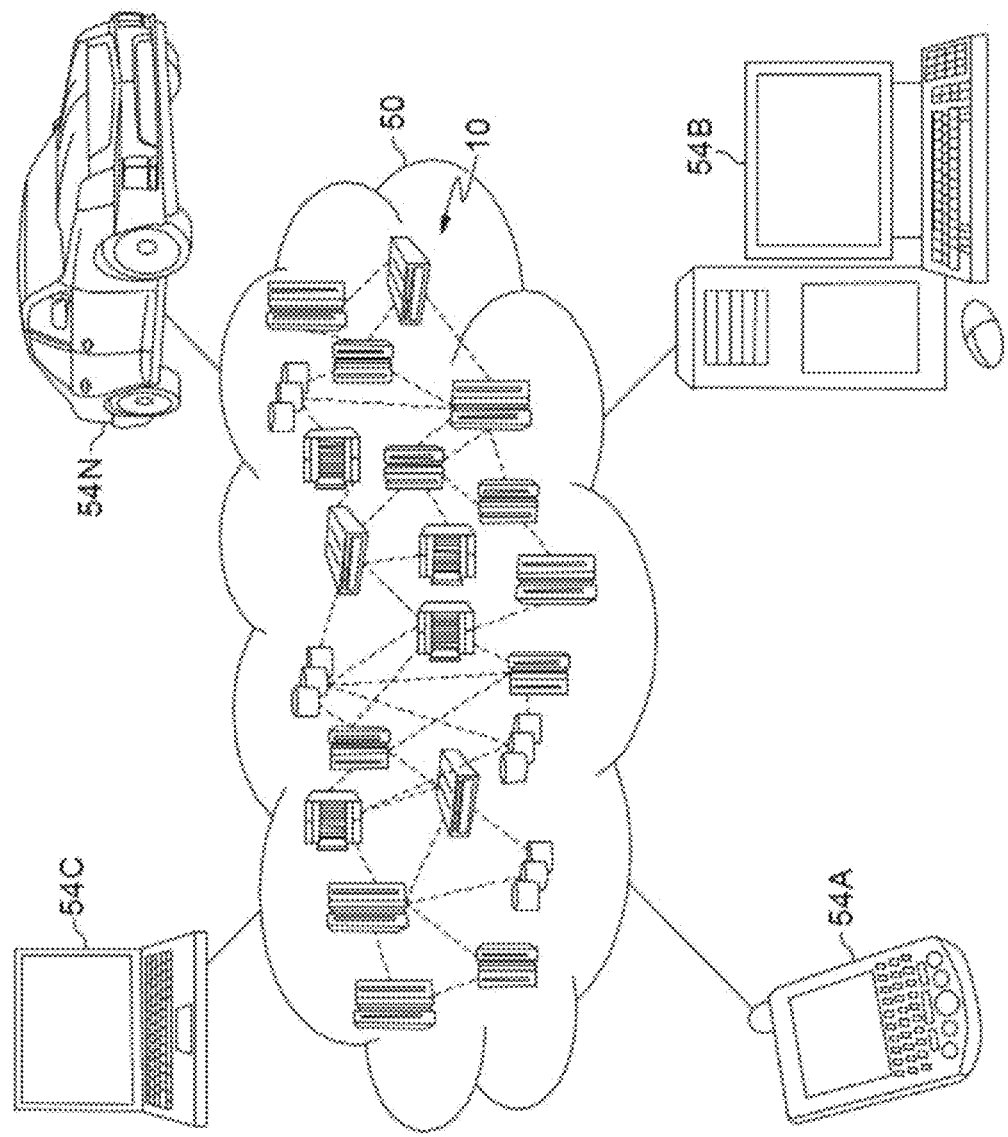
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
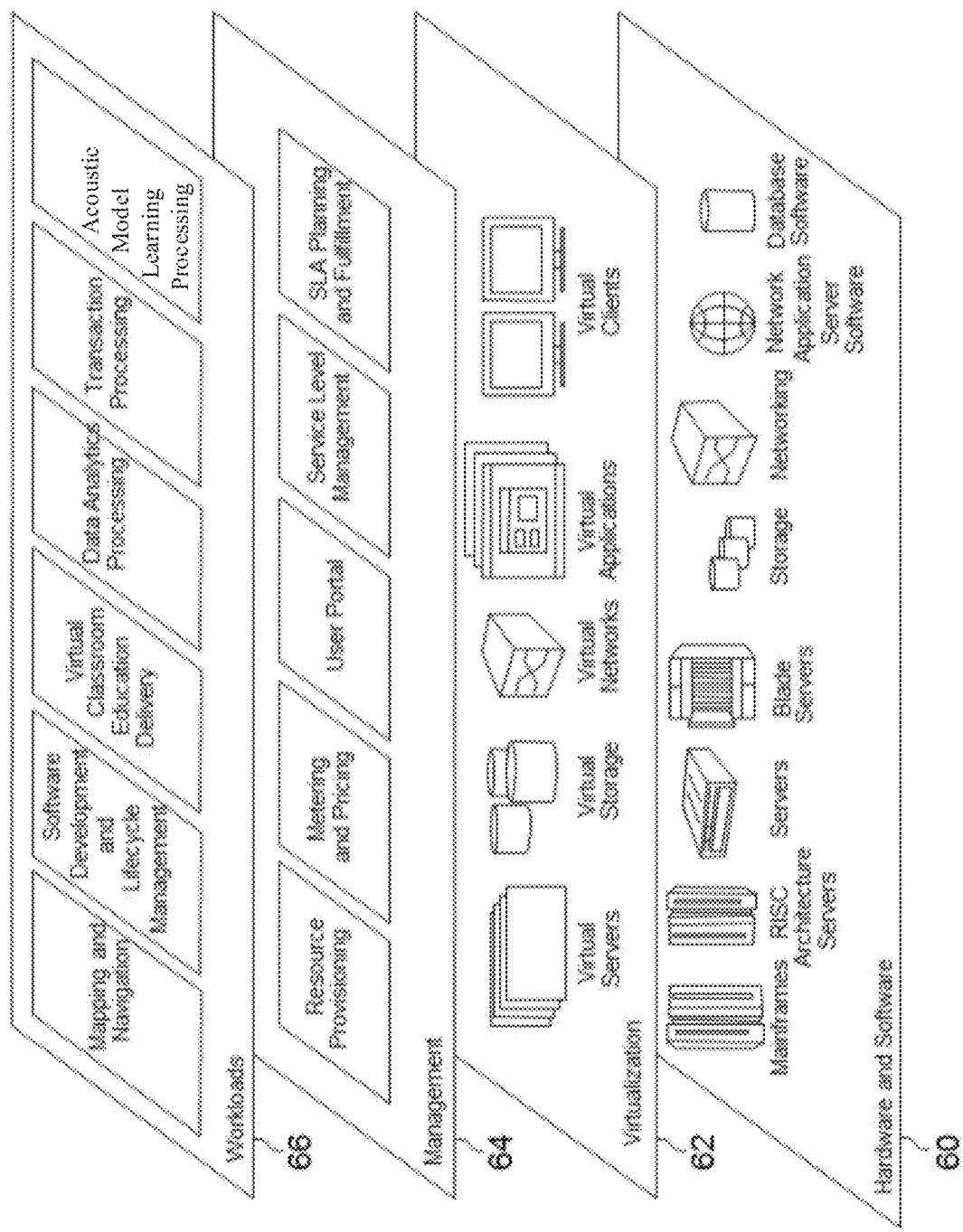
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and acoustic model learning processing.

In a particular embodiments, there is provided a computer program product or software that implements the acoustic model learning processing in accordance with embodiments described herein, as a service in a cloud environment. In this particular embodiment, any steps of the above-mentioned novel learning process for the NN based acoustic model may be performed in the cloud computing environment. The acoustic model learning processing may be implemented as a software module including program instructions and/or data structures in conjunction with hardware components provided by hardware and software 60. The above-mentioned novel learning process can be executed on a single instance of computer or a plurality of instances in a distributed manner. However, this is an example of possible configurations, and the acoustic model learning processing in accordance with embodiments described herein can be implemented by using one or more computing devices such as servers.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for learning a neural network having a plurality of filters that extract acoustic features, performed by a computing device, the method comprising:
    calculating a plurality of projection parameter sets comprising biases of and weights between units of the neural network, by analyzing one or more acoustic training data from an input space of a rectangular local window having a size of N frames×M frequency bands, the plurality of the projection parameter sets defining a projection of each training data into a new space, each projection parameter set having a same size as the filters in the neural network; and
    setting at least a part of the plurality of the projection parameter sets as initial parameters of at least a part of the plurality of the filters in the neural network for training.

2. The method of claim 1, wherein each training data has features and an associated class, and the calculating the plurality of the projection parameter sets includes:
    finding the plurality of the projection parameter sets so as to maximize a separability of the features of the training data having different classes and to minimize variability of the features of the training data having same class in the new space.

3. The method of claim 2, wherein the method further comprises:
    selecting the at least part of the plurality of the projection parameter sets based on scaling factors each corresponding to each projection parameter set, the scaling factors being calculated by the analyzing of the one or more training data together with the plurality of the projection parameter sets.

4. The method of claim 1, wherein each training data is divided into a plurality of frequency components with each frequency component comprising a limited range of frequencies, has features and an associated class, and the calculating the plurality of the projection parameter sets includes:
    calculating the plurality of projection parameter sets for each limited range of frequencies;
    calculating a within-class covariance matrix and a between-class covariance matrix based on the features and the associated class of each training data; and
    estimating eigenvectors of a product of an inverse of the within-class covariance matrix and the between-class covariance matrix based on a Linear Discriminant Analysis (LDA) criterion, each projection parameter set being obtained as each eigenvector.

5. The method of claim 4, wherein the method further comprises:
    selecting at least part of the eigenvectors as the at least part of the plurality of the projection parameter sets based on eigenvalues each corresponding to each eigenvector.

6. The method of claim 4, wherein the calculating the plurality of the projection parameter sets further includes:
    orthogonalizing the eigenvectors by a semi-tied covariance based technique.

7. The method of claim 1, wherein each training data has features and an associated class, and the plurality of the projection parameter sets define a projection of the features of each training data into the new space so that the features of the training data having different classes are projected separatively and the features of the training data having same class are projected aggregatively.

8. The method of claim 1, wherein each training data has features, and the calculating the plurality of the projection parameter sets includes:
    estimating eigenvectors of a covariance matrix based on the features of the one or more training data by Principal Component Analysis (PCA), each projection parameter set being obtained as each eigenvector.

9. The method of claim 1, wherein the method further comprises:
    preparing the one or more training data by dividing the data into a plurality of frequency components with each frequency component comprising a limited range of frequencies and by sliding the local window along with at least one direction over one or more feature inputs, the local window having a same size as the filters in the neural network.

10. The method of claim 9, wherein the preparing the one or more training data includes:
    preparing each group of the training data by sliding the local window within each limited range;
    wherein the calculating the plurality of the projection parameter sets includes:
    calculating a plurality of projection parameter sets for each limited range based on each group of the training data.

11. The method of claim 9, wherein each feature input has an attribute, and the preparing the one or more training data includes:
    preparing each group of the training data from each group of feature inputs having same attribute;
    wherein the calculating the plurality of the projection parameter sets includes:
    calculating a plurality of projection parameter sets for each attribute based on each group of the training data, the plurality of the projection parameter sets for each attribute being merged.

12. The method of claim 1, the neural network includes at least a convolutional layer having the plurality of the filters, the one or more training data including acoustic features having a plurality of frames and a plurality of frequency bands, the data being divided into a plurality of frequency components with each frequency component comprising a limited range of frequencies, the method further comprising:
  training the neural network with the initial parameters.

13. A computer system for learning a neural network having a plurality of filters that extract acoustic features, by executing program instructions, the computer system comprising:
  a memory tangibly storing the program instructions;
  a processor in communications with the memory, wherein the computer system is configured to:
  calculate a plurality of projection parameter sets comprising biases of and weights between units of the neural network, by analyzing one or more acoustic training data from-an input space of a rectangular local window having a size of N frames×M frequency bands, the plurality of the projection parameter sets defining a projection of each training data into a new space, each projection parameter set having a same size as the filters in the neural network; and
  set at least part of the plurality of the projection parameter sets as initial parameters of at least part of the plurality of the filters in the neural network for training.

14. The computer system of claim 13, wherein each training data has features and an associated class and the computer system is further configured to:
  find the plurality of the projection parameter sets so as to maximize separability of the features of the training data having different classes and to minimize variability of the features of the training data having same class in the new space.

15. The computer system of claim 13, wherein each training data is divided into a plurality of frequency components with each frequency component comprising a limited range of frequencies, has features and an associated class and the computer system is further configured to:
  calculate the plurality of projection parameter sets for each limited range of frequencies;
  calculate a within-class covariance matrix and a between-class covariance matrix based on the features and the associated class of each training data; and
  estimate eigenvectors of a product of an inverse of the within-class covariance matrix and the between-class covariance matrix based on a Linear Discriminant Analysis (LDA) criterion, each projection parameter set being obtained as each eigenvector.

16. The computer system of claim 15, wherein the computer system is further configured to:
  orthogonalize the eigenvectors by a semi-tied covariance based technique.

17. The computer system of claim 13, wherein the computer system is further configured to:
  prepare each group of the training data by sliding the local window along with at least one direction over each part of one or more feature inputs, the local window having a same size as the filters in the neural network, the plurality of the projection parameter sets being calculated for each part based on each group of the training data.

18. A computer program product for learning a neural network having a plurality of filters that extract acoustic features, the computer program product comprising a computer readable storage medium having program instructions embodied therewith, the program instructions executable by a computer to cause the computer to perform a method comprising:
  calculating a plurality of projection parameter sets comprising biases of and weights between units of the neural network, by analyzing one or more acoustic training data from an input space of a rectangular local window having a size of N frames×M frequency bands, the plurality of the projection parameter sets defining a projection of each training data into a new space, each projection parameter set having a same size as the filters in the neural network; and
  setting at least part of the plurality of the projection parameter sets as initial parameters of at least part of the plurality of the filters in the neural network for training.

19. The computer program product of claim 18, wherein each training data has features and an associated class, and the calculating the plurality of the projection parameter sets includes:
  finding the plurality of the projection parameter sets so as to maximize separability of the features of the training data having different classes and to minimize variability of the features of the training data having same class in the new space.

20. The computer program product of claim 18, wherein each training data has features and an associated class, and the calculating the plurality of the projection parameter sets includes:
  calculating a within-class covariance matrix and a between-class covariance matrix based on the features and the associated class of each training data; and
  estimating eigenvectors of a product of an inverse of the within-class covariance matrix and the between-class covariance matrix based on a Linear Discriminant Analysis (LDA) criterion, each projection parameter set being obtained as the eigenvector.

* * * * *